US011477046B2

(12) United States Patent
Petit et al.

(10) Patent No.: US 11,477,046 B2
(45) Date of Patent: Oct. 18, 2022

(54) AGGREGATION OF CONNECTED OBJECTS

(71) Applicant: ORANGE, Issy-les-Moulineaux (FR)

(72) Inventors: Stéphane Petit, Chatillon (FR); Olivier Berteche, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 35 days.

(21) Appl. No.: 17/058,912

(22) PCT Filed: May 17, 2019

(86) PCT No.: PCT/FR2019/051132
§ 371 (c)(1),
(2) Date: Nov. 25, 2020

(87) PCT Pub. No.: WO2019/229328
PCT Pub. Date: Dec. 5, 2019

(65) Prior Publication Data
US 2021/0218593 A1 Jul. 15, 2021

(30) Foreign Application Priority Data
May 30, 2018 (FR) ..................................... 1854614

(51) Int. Cl.
*H04L 12/18* (2006.01)
*H04L 12/28* (2006.01)
*H04L 12/66* (2006.01)

(52) U.S. Cl.
CPC ........ *H04L 12/2816* (2013.01); *H04L 12/283* (2013.01); *H04L 12/2807* (2013.01); *H04L 12/66* (2013.01)

(58) Field of Classification Search
CPC ............. H04L 12/2816; H04L 12/2807; H04L 12/283; H04L 12/66; G06F 2221/2141; G06F 21/6218
See application file for complete search history.

(56) References Cited

U.S. PATENT DOCUMENTS 5,461,698 A * 10/1995 Schwanke ............ G06K 9/6253
706/31
2002/0178273 A1 * 11/2002 Pardo-Castellote .... H04L 29/06
709/230

(Continued)

OTHER PUBLICATIONS

International Search Report dated Nov. 14, 2019 for corresponding International Application No. PCT/FR2019/051132, dated May 17, 2019.

(Continued)

*Primary Examiner* — Christine Ng
(74) *Attorney, Agent, or Firm* — David D. Brush; Westman, Champlin & Koehler, P.A.

(57) ABSTRACT

A method and device for aggregating connected objects of a communications network. The connected objects have at least one basic feature. The method includes the following steps implemented on an aggregation device, in order to obtain a group avatar suitable for representing the connected objects: obtaining at least one basic feature; obtaining at least one feature of the group object, linked to a basic feature; and creating the group avatar including: a structure having a basic feature; a structure having a group feature; a structure for linking the group feature to at least one basic feature; and a group proxy structure having an association between an address of the group avatar and an address of the connected objects.

19 Claims, 3 Drawing Sheets

(56) References Cited

U.S. PATENT DOCUMENTS

| | | | | |
|---|---|---|---|---|
| 2013/0145299 | A1* | 6/2013 | Steimle | G06F 3/048 715/771 |
| 2013/0258953 | A1* | 10/2013 | Huang | H04W 4/70 370/329 |
| 2014/0241354 | A1 | 8/2014 | Shuman et al. | |
| 2017/0034591 | A1* | 2/2017 | Ray | G06Q 30/0269 |
| 2017/0052774 | A1* | 2/2017 | Ankapura | G06F 8/61 |
| 2019/0188251 | A1* | 6/2019 | Liu | G06F 40/274 |

OTHER PUBLICATIONS

Written Opinion of the International Searching Authority dated Nov. 14, 2019 for corresponding International Application No. PCT/FR2019/051132, filed May 17, 2019.

Muhammad Golam Kibria et al., "Logistic Model to Support Service Modularity for the Promotion of Reusability in a Web Objects-Enabled IoT Environment" Sensors 2017, 17(10), 2180, Sep. 22, 2017 (Sep. 22, 2017), pp. 1-21, Retrieved from the Internet: https://doi.org/10.3390/s17102180, [retrieved on Feb. 26, 2019], XP055562217.

Hussein Dina et al., "Access control in IoT: Form requirements to a candidate vision" 2017 20th Conference on Innovations in Clouds, Internet and Networks (ICIN), IEEE, Mar. 7, 2017 (Mar. 7, 2017), pp. 328-330, DOI: 10.1109/ICIN.2017.7899435, XP033085397.

Boussard Mathieu et al., "The Majord'Home: a SDN approach to let isps manage and extend their customers'home networks" 10th International Conference on Network and Serive Management (CNSM) and Workshop, IFIP, Nov. 17, 2014 (Nov. 17, 2014), pp. 430-433, DOI: 10.1109/CNSM.2014.7014207, XP032724779.

Robert Kleinfeld et al., "glue.things" Web of Things, ACM, 2 Penn Plaza, Suite 701 New York NY 10121-0701 USA, Oct. 8, 2014 (Oct. 8, 2014), pp. 16-21, DOI: 10.1145/2684432.2684436, ISBN: 978-1-4503-3066-4, XP058067890.

Mrissa Michael et al., "An Avatar Architecture for the Web of Things" IEEE Internet Computing, Institute of Electrical and Electronics Engineers, US, vol. 19, No. 2, Mar. 1, 2015 (Mar. 1, 2015), pp. 30-38, [retrieved on Mar. 16, 2015], DOI: 10.1109/MIC.2015.19, ISSN: 1089-7801, XP011575894.

English translation of the Written Opinion of the International Searching Authority dated Nov. 25, 2019 for corresponding International Application No. PCT/FR2019/051132, filed May 17, 2019.

* cited by examiner

AGGREGATION OF CONNECTED OBJECTS

CROSS-REFERENCE TO RELATED APPLICATIONS

This Application is a Section 371 National Stage Application of International Application No. PCT/FR2019/051132, filed May 17, 2019, which is incorporated by reference in its entirety and published as WO 2019/229328 A2 on Dec. 5, 2019, not in English.

TECHNICAL FIELD

The invention relates to the general field of telecommunications networks and more particularly to the Internet of Things.

PRIOR ART

For a few years now, the Internet of Things—or IoT—has been in use in the public arena and in the business world. Connected objects include, for example, household objects such as cameras, bulbs, lamps, radiators, or audio or video devices, electricity meters, vehicles, watering systems, etc. Connected objects communicate with one another via several categories of networks, which may be wired or wireless.

These objects are generally limited in terms of functionalities, in particular those which are not in direct relation with the service implemented by means of the object as initially intended by its maker.

It is therefore desirable to be able to group them together in order to benefit from extended functionalities.

There are solutions for grouping connected objects. For example, patent application US 2014/0241354 A1 describes a system for communication between one or more IoT groups. Predefined object groups may be formed because they perform similar activities or come within certain contexts (location, presence of the owner, state of the devices, use of a common resource, etc.). In addition, IoT groups may be organized hierarchically in order to ensure effective communication within groups and between different groups.

However, these solutions constitute object catalogs whose goal is to access connected objects more quickly and to make them communicate more straightforwardly. The objects of the group remain independent of one another.

There are also solutions for creating scenarios involving a plurality of household objects. For example, the aforementioned application proposes a scenario in which a plurality of connected objects are used to provide a given user with a given temperature: when a user enters a room, their personal tablet is detected and then the temperature is controlled and adjusted according to the preferences of the user. This scenario involves at least three connected objects which may advantageously be grouped together: an object for detecting the presence of the user, a temperature sensor and a heating/air-conditioning element for adjusting it.

These solutions constitute scenarios whose aim is to provide a service by linking the actions of the connected objects of a group. However, the objects of the group remain independent of one another.

This presents a certain number of problems: first of all, the group is considered as a collection and not as an aggregation of objects. Moreover, all of the features of the objects thus grouped remain accessible to the owner and to the users of the group, which is not desirable. For example, in the above scenario, if the object used to detect the presence of the user in the room is a camera, it is not necessarily desirable for any user in the group to access all of the functions of the camera, but rather only the result of the detection.

The invention offers a solution which does not have the drawbacks of the prior art.

THE INVENTION

To this end, according to one functional aspect, one subject of the invention is a method for an aggregation of at least two connected objects of a communications network, said connected objects having at least one feature, called a basic feature, said method being characterized in that it comprises the following steps on an aggregation device, in order to obtain a representation of the group, called a group avatar, suitable for representing said connected objects to be aggregated:
  obtaining at least one basic feature of said connected objects;
  obtaining at least one feature of the group object, said feature being linked to at least one basic feature of said connected objects;
  creating the group avatar, said avatar comprising:
    at least one first data structure for said connected objects, called a basic structure, comprising said at least one basic feature;
    a second data structure, called a group structure, comprising said at least one feature of the group object;
    a third data structure, called a link structure, for linking said feature of the group object to at least one basic feature;
    an address management structure, called a group proxy, comprising at least one correspondence between at least one address of the group avatar and at least one address of said connected objects.

What is meant by "connected object" here is any physical or logical entity capable of rendering a service to a user in a communications network, for example:
  connectable personal equipments (smartphone, connected watch, connected headset, home automation equipment, etc.);
  equipments in the public space to which the user may have access;
  content (films, music) and access to content.
  A connected object comprises a set of features:
  functions (giving the time, the temperature, streaming a video stream, etc.);
  streams associated with the input or output functions of the object: commands, responses, messages, data streams, for example audiovisual, etc. The term "stream" is considered here in the broad sense. For example, a message (command, request, response, acknowledgment, etc.) is a time-limited data stream.

What is meant by "aggregation" is the creation of a (virtualized) group object associated with several connected objects, the group object having an address for accessing each of the connected objects. The group object, after its creation, offers, or shows, its own features which may correspond to any combination of the features of the connected objects (enhancement, cascading, cooperation, etc.)

What is meant by "group object" is an object which comprises the connected objects and their encapsulation according to the present invention, that is to say an avatar of the objects. The avatar is called a "group avatar".

What is meant by "group avatar" is a representation, or encapsulation of a plurality of objects; the group avatar therefore comprises:

one or more features (functions and streams) of each of the objects of the group;

one or more features (functions and streams) specific to the group object;

a set of links, or functions, for linking (combining, exploiting, etc.) together one or more features of the basic objects and of the objects of the group;

a proxy structure in order to allow a user of the group to access each of the connected objects via at least one address of the connected object. What is meant by address of the connected object is any type of address corresponding to the access to all or some the features of the connected object. Such an address may be physical (http://192.145.1.1) or symbolic (zoom.ov3@mypasserelle.fr in order to access the zoom function of the camera object via the home gateway). It may take the form of a universal address (URI, URL), an IP address, etc.

According to the invention, the accessible functions or the streams generated by the group object are encapsulated in a virtualized object, called a group avatar, such that the connected objects are "hidden" behind the group object and its avatar. The connected object may also remain directly accessible, or form part of another group, a collection, etc.

Advantageously, a user of the group object does not access it directly but via its group avatar. The user can therefore invoke the group avatar in order to access the connected objects of the group. The group object, that is to say the entity formed by the connected objects and their group avatar, implements the features of the connected objects and the specific features of the group object.

For example, a webcam may be associated with a thermometer and/or a clock and/or a motion detector. According to another example, all of the communicating objects in a meeting room, a bedroom, a house, etc. may be grouped together in a virtual object called "meeting room" "my room", "my house", etc.

Advantageously, the connected objects of the group are not a simple collection but are linked so as to form a new (group) object which, for example, fulfills a PLC function by using the input-output streams of several objects in cascade. For example, if the camera and motion detector mentioned above form part of the same group, it may be imagined that the detection of motion by the detector triggers still image capture by the camera which outputs an image (photograph) of the detected person. A link is therefore created between the two objects of the group so as to offer a function specific to the group object (detecting a person).

According to one particular embodiment of the invention, the aggregation method as described above is characterized in that the group avatar also comprises a data structure, called a rights structure, comprising at least one right associated with a feature, and in that the method further comprises:

a step of obtaining at least one right associated with a feature;

a step of registering said right in said structure of the group avatar.

Advantageously according to this embodiment, it is possible to benefit from a control of the rights to the group object and/or the connected objects of the group. Thus, a right may be granted for a feature of the group object or of an object of the group such that the owner controls the rights of the users on their group object and the connected objects constituting it. For example, the owner may have all the rights but grant to a user of the group object only the rights to the features of the group object but not to the features of the connected objects constituting it, the user distinct from the owner not being able, in this case, to implement the feature (function or stream) of the connected object.

According to one variant of this particular embodiment of the invention, the aggregation method as described above is characterized in that the rights structure further comprises an identification of at least one beneficiary of the right and in that the method further comprises:

a step of obtaining said at least one beneficiary of the right associated with a feature;

a step of registering said at least one beneficiary in said structure of the group avatar.

Advantageously according to this embodiment, the owner of the group object and/or of the connected objects may share them with another user or a group of users. Such a group may refer, for example, to a group of users of the local area network, or of the wide area network, or located in a certain geographical proximity, or users identified by name, etc. This makes it possible to discriminate simply between users who have the right to use/compose/transmit an object and those who do not.

According to another variant of this particular embodiment of the invention, which may be implemented as an alternative or in addition to the preceding one, the aggregation method as described above is characterized in that said right is a right of use allowing the associated feature to be implemented.

Advantageously according to this embodiment, the owner of the group object and/or of the connected objects may share them with another user or a group of users for their implementation, either in the group object or as a connected object. Thus some features may be implemented and others not.

According to another variant of this particular embodiment of the invention, which may be implemented as an alternative or in addition to the preceding ones, the aggregation method as described above is characterized in that said right is a composition right allowing the use of an object of the group or the group object in a new group object.

Advantageously according to this embodiment, the owner of the group object and/or of the connected objects may authorize another user or a group of users to compose their own group object from the group object or from the connected objects which constitute it.

According to another variant of this particular embodiment of the invention, which may be implemented as an alternative or in addition to the preceding ones, the aggregation method as described above is characterized in that said right is a transmission right allowing the transmission of a right of use or composition right.

Advantageously according to this embodiment, the owner of the group object and/or of the connected objects may authorize another user to transmit the right of use and composition right to a third-party user or group of users.

According to another variant of this particular embodiment of the invention, which may be implemented as an alternative or in addition to the preceding ones, the aggregation method is characterized in that the step of obtaining the right is a step of deducing the right associated with a feature of the group object according to at least one right associated with a basic feature.

Advantageously according to this embodiment, since a right has been granted to a feature of one of the connected objects (for example the camera), a right to the group object may be deduced therefrom automatically. For example, the group object may directly inherit the rights of the camera, or a combination of the rights of the camera and the motion detector, or inherit the most restrictive, the broadest, right of one of the connected objects, etc.

According to another variant of this particular embodiment of the invention, which may be implemented as an alternative or in addition to the preceding one, the aggregation method as described above is characterized in that it further comprises a step of deducing the right associated with a basic feature according to at least one right associated with a feature of the group.

Advantageously according to this variant, since a right has been granted to one of the features of the group object (for example, the person detector), the connected objects which constitute the group (for example the camera) may be deduced therefrom automatically. For example, the camera object may directly inherit the right of the "person detector" group object.

According to another functional aspect, the invention also relates to a method for an implementation of a group object aggregating at least two objects connected in a communications network, said group object comprising a group avatar, the method being characterized in that it comprises the following steps on a device for the implementation of the group object:
 obtaining a message to use the group object, said message comprising at least one feature of the group object to be implemented;
 obtaining the avatar of the group object, said avatar comprising at least:
  a first data structure, called a basic structure, comprising said at least one basic feature of each of the aggregated connected objects;
  a second data structure, called a group structure, comprising at least one feature of the group object;
  a third data structure, called a link structure, for linking said feature of the group to at least one basic feature;
  an address management structure, called a group proxy, comprising a correspondence at least between at least one address of the group avatar and at least one address of said aggregated connected objects;
 comparing the group feature to be implemented with the features of the group avatar;
 depending on the results of the comparison:
  analyzing the feature of the group object to be implemented;
  obtaining, in the link structure, the link from said group feature to at least one basic feature;
  implementing said at least one basic feature of a connected object.

The subjects according to this functional aspect of the invention provide at least the same advantages as those provided by the method according to the first functional aspect. The optional features mentioned for the first aspect may also apply. In particular, the group object encapsulates the connected objects of the group so as to be able to access the features (functions and streams) of the connected objects by virtue of the group avatar. Thus, implementation, composition, transmission rights may be inserted into the structure of the group object and used by the method for the implementation of the group object via a step of analyzing said rights. The right of the user who made the request is compared with the right associated with the feature. If the user does not have the right of use (or composition, transmission right) with respect to the required feature, it is not implemented.

According to one hardware aspect, the invention also relates to a device for an aggregation of at least two connected objects in a communications network, said connected objects having at least one feature, called a basic feature, said device being characterized in that it comprises the following modules in order to obtain a representation of the group, called a group avatar, suitable for representing said connected objects to be aggregated:
 a module for obtaining at least one basic feature of said connected objects;
 a module for obtaining at least one feature of the group object, said feature being linked to at least one basic feature of said connected objects;
 a module for creating the group avatar, said avatar comprising:
  at least one first data structure for said connected objects, called a basic structure, comprising said at least one basic feature;
  a second data structure, called a group structure, comprising said at least one feature of the group object;
  a third data structure, called a link structure, for linking said feature of the group to at least one basic feature;
  an address management structure, called a group proxy, comprising at least one correspondence between at least one address of the group avatar and at least one address of said connected objects.

The term module used in the present description may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

According to another hardware aspect, the invention also relates to a device for an implementation of a group object aggregating at least two connected objects and having a group avatar in a communications network, the implementation device comprising:
 a module for obtaining a message to use the group object, said message comprising at least one feature of the group object to be implemented;
 a module for obtaining the avatar of the group object, said avatar comprising at least:
  a first data structure, called a basic structure, comprising said at least one basic feature of said connected objects;
  a second data structure, called a group structure, comprising at least one feature of the group object;
  a third data structure, called a link structure, for linking said feature of the group to at least one basic feature;
  an address management structure, called a group proxy, comprising a correspondence at least between at least one address of the group avatar and at least one address of said aggregated connected objects;
 a module for comparing the group feature to be implemented with the features of the group avatar;
 a module for analyzing the feature of the group object to be implemented;
 a module for obtaining, in the link structure, the link from said group feature to at least one basic feature;
 a module for implementing said at least one basic feature.

According to another hardware aspect, the invention also relates to a home gateway comprising an aggregation device and/or a device for the implementation of a group object as described above.

According to another hardware aspect, the invention also relates to a group object comprising:
at least two connected objects having at least one basic feature and one address;
an avatar of said group object, comprising:
at least one first data structure, called a basic structure, comprising said at least one basic feature of said aggregated connected objects;
a second data structure (SD_OG), called a group structure, comprising at least one feature of the group object;
a third data structure, called a link structure, for linking said feature of the group to at least one basic feature;
an address management structure, called a group proxy, comprising a correspondence at least between at least one address of the group avatar and at least one address of said aggregated connected objects.

According to another hardware aspect, the invention also relates to a computer program suitable for being implemented on an aggregation device as described above, the program comprising code instructions which, when the program is executed by a processor, carries out the steps of the aggregation method defined above.

According to another hardware aspect, the invention also relates to a computer program suitable for being implemented on an implementation device as described above, the program comprising code instructions which, when the program is executed by a processor, carries out the steps of the method for the implementation of a group object defined above.

According to yet another hardware aspect, the invention pertains to a recording medium suitable for being read by a data processor and on which is recorded a program comprising program code instructions for the execution of the steps of whichever of the methods defined above.

The subjects according to the hardware aspects of the invention provide at least the same advantages as those provided by the method according to the first functional aspect. The optional features mentioned for the first aspect may be applied to the hardware aspects.

The invention will be better understood from reading the following description, given by way of example and with reference to the appended drawings.

THE FIGURES

DETAILED DESCRIPTION OF ONE EXEMPLARY EMBODIMENT ILLUSTRATING THE INVENTION

Figure 1:
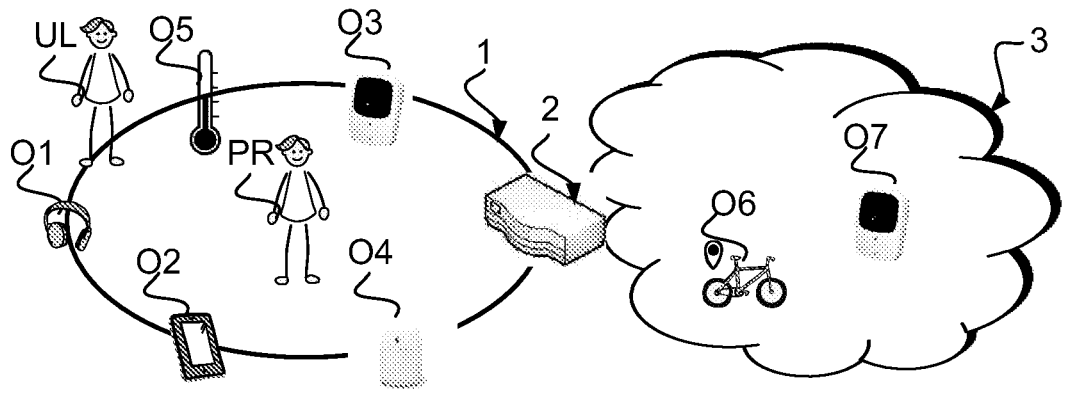
FIG. 1 shows the general context of the invention, showing connected objects of a user of a local area network according to the prior art.

FIG. 1 shows the general context of the invention according to the prior art, showing connected objects of a user and owner PR of a local area network or LAN 1. According to this non-limiting example, the LAN network is a home network connected to a wide area network, or WAN 3, for example an Internet network. More broadly, a LAN network could be a corporate network or be limited to a single object connected to the Internet network (for example a beach webcam) and the WAN network 3 could be of any type (cellular, GSM—Global System for Mobile Communications, UMTS—Universal Mobile Telecommunications System, Wi-Fi—wireless, etc.) without departing from the scope of the invention.

A network management element (2) (a home or business gateway, a hub, etc.) and terminal equipments, hereinafter called connected objects or just objects (Oi, where i indicates the number of the object) are connected to the local area network 1. According to the example, these are a connected headset (O1), a smartphone (O2), a connected camera (O3), a motion detector (O4) and a temperature sensor (O5). These objects are able to communicate over the local area network and may be accessed from inside or outside the local area network via the service gateway (2).

Other objects located in the wide area network (3) may also be of interest to a user of the local area network, for example a shared bicycle (O6) or a beach camera (O7).

According to this example, the objects are physical objects, that is to say physical equipments having the capability of connecting to the network. The connected object may be a provider of an information stream, in real time or otherwise, and/or an actuator in the sense that the receiving of a particular information stream (for example, commands) causes an action associated with a function on its part. These objects may differ in their operating system (Windows, Linux, Android, etc.), their type of network connection (Ethernet, Wi-Fi, Bluetooth, etc.), and the functions/actions of which they are capable: measuring the temperature, communicating over social networks, implementing a cooking recipe, reading multimedia content, recording a surveillance video, transmitting it, detecting movement, turning on a lamp, etc.

In addition, these objects may also be characterized in terms of ownership and access: they may be personal, i.e. they belong to their owner PR, or shared, i.e. that they can be made available to another user, for example a guest of the local area network, or even public, that is to say that they can be made available to anyone, etc.

It may now be noted that each of the objects, having a certain number of features (functions and/or input/output streams), could usefully be grouped together with other objects with complementary features in order to form a new object. According to some examples:

the local area network camera does not have biometric recognition software; it may be useful to identify, in a straightforward manner, a person who is in the field of the camera;

the bicycle in the wide area network may be stolen; it may be useful to film it when someone is approaching it;

etc.

Figure 2:
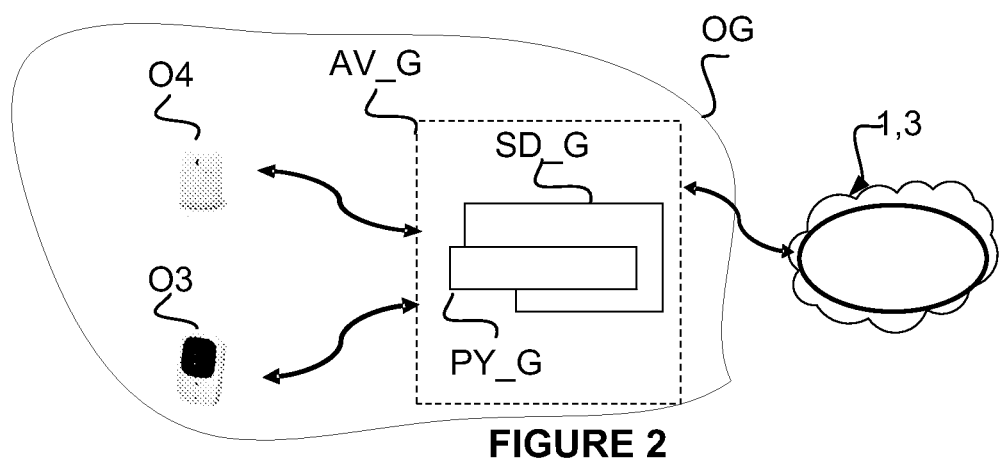
FIG. 2 illustrates the formation of a group object according to one embodiment of the invention.

One embodiment of the invention will now be described with reference to FIG. 2. The goal is to offer the user a virtualized group object, more simply just called a group object, corresponding to a group of connected objects in their environment.

A group of objects is according to this example a grouping of connected objects made at the initiative of their owner. By virtue of the aggregation method, this group is considered to be an object itself, also called a group object, having its own information streams and its own actions.

According to the example described here by way of indication, the camera object (O3) in the local area network of the user will be grouped together with the motion sensor object (O4). The resulting object (O3+O4) is a group object (OG), that is to say a particular object corresponding to the two connected objects but with specific features. To this end, the group object is virtualized, that is to say that it is represented as an entity performing functions and having input and output streams. All of the streams of the group object pass through a software assembly akin to a proxy, the group object avatar (AV_G), or group avatar, constructed on the streams from or to at least one of the objects of the group. This group avatar represents the group of objects on the network and shows the function of the group object.

The avatar is therefore a "standardized" interface with capabilities that can also be standardized (time stamp, temperature, zoom, etc.). It is a kind of overlayer of the objects of the group (encapsulation).

According to one variant, the objects may be grouped together automatically according to an aggregation criterion (location, functions rendered, types of exchangeable streams, etc.), instead of at the initiative of the owner.

According to one embodiment of the invention, which will be detailed more precisely with reference to the following figures, the user chooses to create a group, for example, "my person detector", denoted by OG, with avatar AV_G. This group object provides the following service: when the user enters the room in which the camera is located, the motion detector is triggered, it activates the camera which takes a photograph (still image capture) of the person who has entered the room; this image output by the camera is made accessible to the user of the group object.

An aggregation device on the gateway constructs a group avatar (AV_G) for the group (OG), which may be made available over the local area network 1 and/or over the wide area network 3. The group includes the motion detector O3 and the camera O4. It is this one which shows the image output by the camera.

Each of the connected objects comprises a certain number of features, only a subset of which is offered to the user of the group object: the stream of the camera or the motion detector are not accessed; only the end image of the person who has entered the room. Other functions of the camera (zoom, video capture, etc.) are not accessed either.

Such a grouping of objects makes it possible not only to create new objects but also to suggest others to the user. According to one variant, the user may be notified that they may form a person detector object based on the camera and their motion detector but they may also be informed that if they had a face recognition device they could identify the person entering the room and have direct access not to their photograph but to their identity instead.

The objective is therefore to be able to adapt all of the connected objects available to the needs of the user via a smart grouping mechanism.

It should be noted that if several concurrent accesses occur on the same object/group from users who have the same rights, any solution within the capability of those skilled in the art of computer systems could be used to resolve the conflict.

Figure 3:
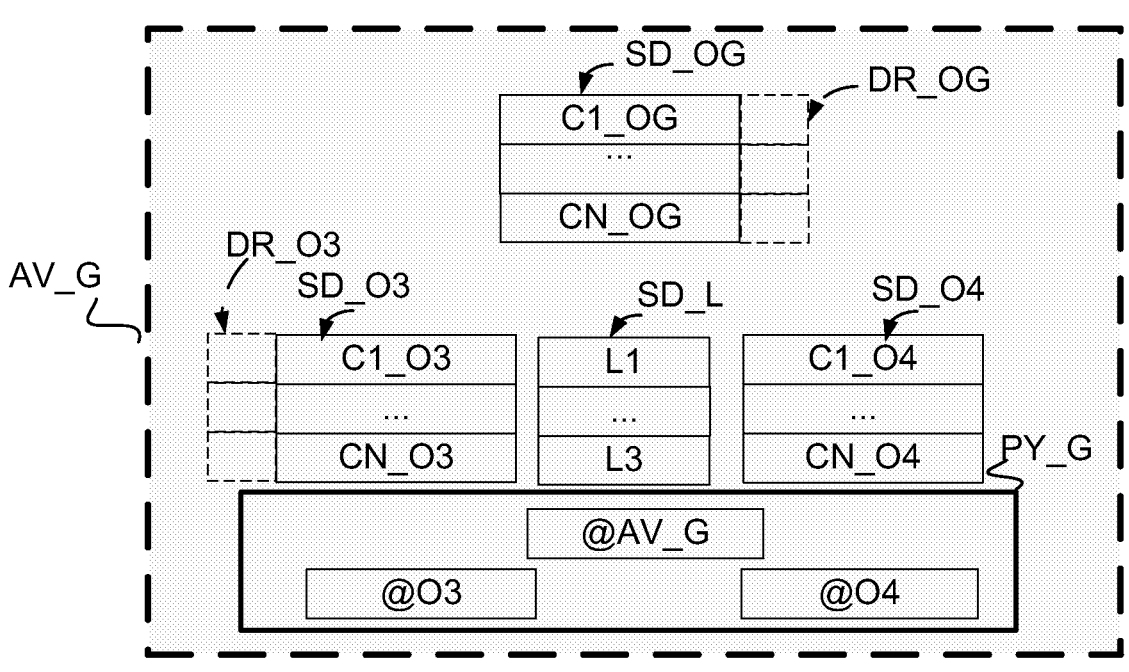
FIG. 3 illustrates a group object avatar according to one embodiment of the invention.

FIG. 3 is a more detailed representation of a possible architecture for a group avatar according to one embodiment of the invention. According to this example, the connected object O3 (the camera) and the connected object O4 (motion detector) are aggregated in the group object OG. It should be noted that while the generation of the avatar (AV_G), as well as its storage, may be carried out on the home gateway, it may also be carried out on a remote server in the network, on a terminal, etc. The avatar comprises, according to this example:

a first data structure (SD_O3) comprising at least one feature (C1_O3 ... CN_O3) of the connected object 3 (zoom, image capture, output video stream, capture launch command, etc.);

a second data structure (SD_O4) comprising at least one feature (C1_O4 ... CN_O4) of the connected object 4 (motion detection, motion type, detected motion information, etc.);

an address management structure, called a proxy (PY_G), comprising a correspondence between at least one address of the avatar (@AV_G) and at least one address of each connected object (@O3, @O4). It is recalled that the address may be of any type and address all or some of the features of one of the connected objects. The group avatar acts as a proxy between the connected object and the requests made to it. It is recalled that a proxy (PY) is a software component that plays the role of intermediary by placing itself between two entities in order to facilitate exchanges. In this case, the proxy (PY_G) of the avatar is placed between the user of the group object, for example a website accessible on a smartphone, and the objects connected over the LAN/WAN. The proxy redirects streams transparently for the user, to and from the connected objects of the group. Structurally:

either the group object has its own proxy; schematically in this case the object will be accessible via an address of the type/my_person_detector;

or it is attached to a proxy which includes a set of avatars; schematically in this case the object will be accessible via an address of the type proxy_objects_groups/my_bedroom/my_person_detector (and another object of the same type, for example in the living room, will be accessible via proxy_objects_groups/my_living_room/my_person_detector).

Reference is made hereinafter to proxy module to designate one or the other of these possibilities.

a link structure (SD_L) allowing links to be established between the objects of the group. What is meant by link is an automatic process which makes it possible to transmit information streams resulting from a combination of streams from or states of objects linked to one another in the group, or to process such information streams. A link is therefore a program or set of programs with inputs and outputs; the inputs are typically the streams from connected objects, the outputs are streams which may be used to feed another connected object of the group or be made available to the user. According to the example mentioned above:

a link L1 of the structure SD_L corresponds to a program which accesses the output of the motion sensor and triggers the camera;

a link L2 retrieves, at the output of the camera, an identification (still image) of the person who has entered the room;

a link L3 could transmit this image to a facial recognition module and retrieve the name of the person recognized, then make it available to the user.

A structure SD_OG for hosting the features (C1_OG, C2_OG ... CN_OG) of the group object. The group object created from several connected objects may benefit from the features of these objects (the output stream of the camera) and/or propose new ones (the person detector).

The avatar may comprise other data, in particular
an identification (ID_O3, ID_O4) of each connected object;
an identification, description, etc. of the group object;
one or more data structures (DR_) of user rights, at the level of the group object (DR_OG) or of the encapsulated objects (DR_03, DR_04);
etc.

Figure 4:
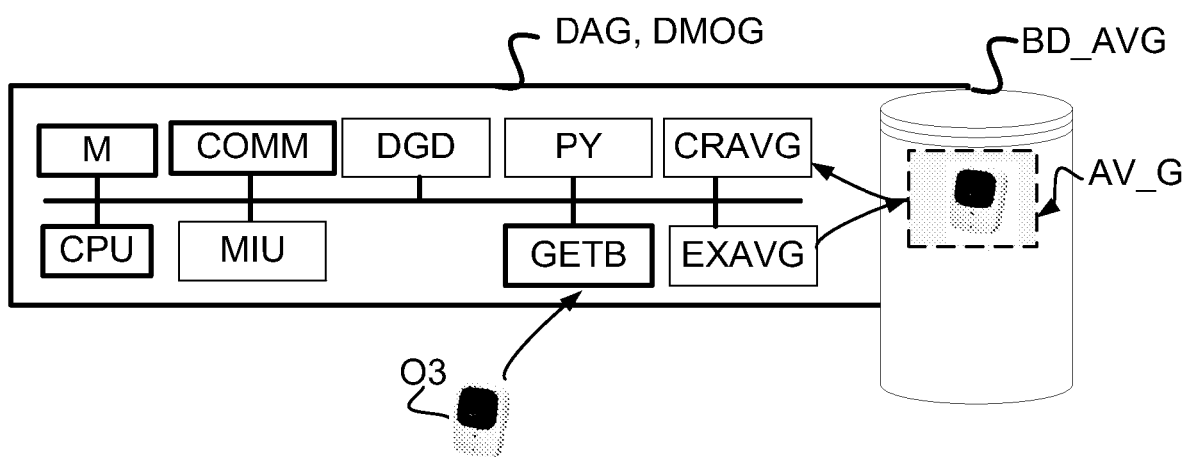
FIG. 4 shows an architecture of a device for the aggregation of objects and/or for the implementation of group objects according to one embodiment of the invention.

FIG. 4 shows an architecture of a device for the aggregation of objects and/or for the implementation of group objects according to one embodiment of the invention. It is located for example on the home gateway. It may alternatively be located in the cloud, on any device in the local area network, etc.

The aggregation system (DAG) comprises:
memories (M) associated with a processor (CPU). The memories may be of ROM (from the English read only memory) or RAM (from the English random access memory) type. They may take the form of a removable card (SD, flash, etc.). Part of the memory M may contain in particular, according to the invention, the avatars corresponding to the group objects, the programs required for their aggregation and implementation, etc.;
a communication module (COMM), for communication with connected objects, with the user, and with various entities of the local and/or wide area network; this module may be of Wi-Fi, Bluetooth, ETHERNET etc. type and use any appropriate protocol to communicate with these entities (http, RTP, etc.);
a module for obtaining the basic features (GETB), making it possible for example to discover a physical object whose reference is communicated to it (for example, a camera) and to deduce therefrom the relevant basic features (functions and streams) of the object;
a group avatar generation module (CRAVG) responsible for aggregating the objects provided to it, that is to say for generating an avatar for a group object;
a proxy management module (PY) which makes it possible to associate a proxy structure (PY_G) with one (or more) group object avatars and subsequently to manage the streams to and from the connected objects which form part of it;
a module for the implementation of the group avatars (EXAVG) which makes it possible, once the group object has been aggregated, that is to say its avatar has been created, to access the group object via the features which are known for it. It should be noted that for reasons of simplification, the module EXAVG has been placed on the aggregation device. However, it could form part of a group avatar implementation device (DMOG) distinct from the aggregation device DAG;
a group avatar database (BD_AVG); this database may be located on the virtualization device or externally. It contains the group object avatars;
a user interface module (MIU), for making available to, or showing, the user an address (@AV_G) for access to the group avatars (AV_G) and the features of the group avatars (for example in the form of a graphical object or HMI which can be transmitted to the user, as shown in FIG. 5 below: representation of the group object in the form of pictograms and associated functions).
a rights management module DGD for initializing and maintaining the rights structures (DR) on the objects.

Figure 5:
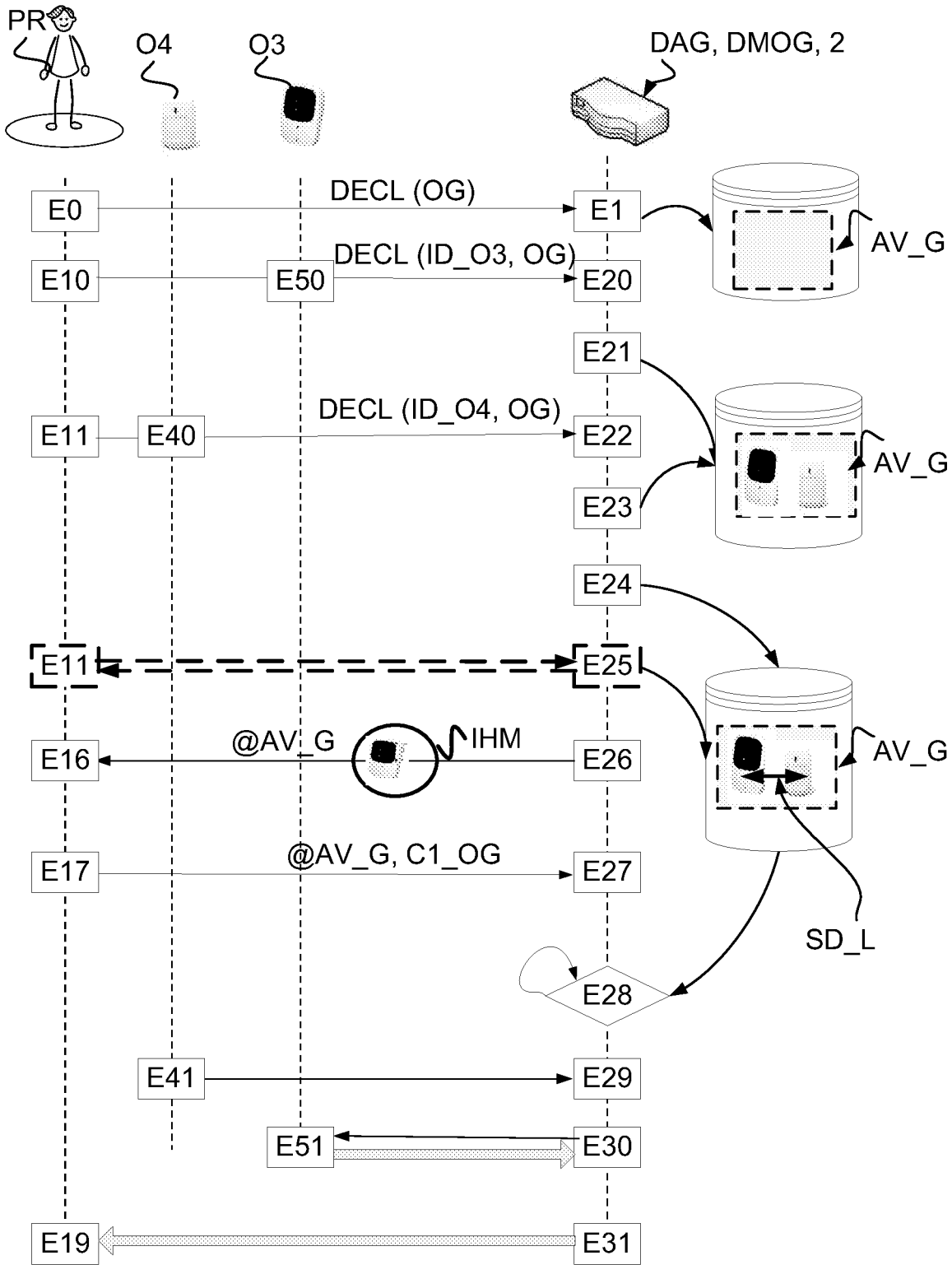
FIG. 5 shows a timing diagram for the aggregation of objects and subsequent implementation of the group object according to one embodiment of the invention.

FIG. 5 shows a timing diagram for the aggregation of connected objects in a group object and subsequent implementation of the group object.

It details in particular the creation of a group object avatar (AV_G) on the object aggregation device DAG, which is located according to this example on a home gateway, and the subsequent use of this group object by its owner. It includes the main phases of creating the group object (declaring the group object, creating its avatar), aggregating the connected objects in the group object, showing the group object (making it available to the user) then implementing the group object according to examples.

According to this embodiment, the devices for the aggregation (DAG) and implementation (DMOG) of the group objects are located on the service gateway. Any other location of either/both of these two devices could be considered: in the local area network, in the wide area network, borne by a server, a terminal, a connected object, etc.

1. Creation of the Group Object

The goal of this phase is to create a group object (OVG) representing one or more connected objects (O3, O4). It is recalled that the group object corresponds to all of the connected objects of the group and its avatar. According to this example it is the user (PR), who is also the owner of the objects in the local area network, who chooses to create a group, according to the example cited above, the "my person detector" object OG, by grouping the camera object O3 and the detector object O4 together in the group OG. For example, they select a graphical representation of the two objects on the screen and drag them into the new "my person detector" group object.

In a step E0, the user declares a group OG (name, identifier, etc.). Their request DECL(OG) is received by the aggregation device in a step E1. They create a group avatar (AV_G) for the group object that has just been declared. In particular, they assign it an address (@AV_G) and an identifier (ID_G). The group avatar may subsequently be accessed via this address. It may be on the gateway, or in the network of the operator if the home gateway is virtualized, or in the wide area network (cloud), provided that a secure link is implemented between the group avatar that is located in the network and the corresponding connected objects in the local area network.

2. Aggregation of Connected Objects in the Group Object

It is assumed that the user (PR) has already connected the connected objects that will constitute the group to the network. The objects are therefore known to the home gateway, via an address, an identifier, or according to one variant which will be detailed later, via an avatar of the connected object.

In a step E10/E50, the user and owner PR declares a first connected object to be aggregated in the group object. According to this example, it is a connected camera (O3) in the local area network. The connected object to be aggregated is therefore physical. Any other object could be considered without loss of generality, as described with reference to FIG. 1. Several methods may be used:
the connected object declares itself to the service gateway (by providing the name of the camera, its model, etc.);
the user enters the features of the object themself;
etc.

In a step E20, the aggregation device receives the declaration of the object in the schematic form DECL(ID_O3, OG), that is to say an identification of the object and of the group in which it is to be inserted. Then it obtains the features of the object (whether physical or virtual) which has just been declared. To obtain these features, the gateway (module GETB) may, depending on the case:

query the gateway which has registered the object;
query a referencing site for the object in order to receive its function and stream features (for example, the site of the manufacturer for a camera);
receive this information from the connected object or its owner.

On completion of this step, the aggregation device knows the features (stream and functions) of the object.

In a step E21, the aggregation device (DAG, CRAVG) inserts the object into the group avatar AV_G. The group avatar is a software representation of the group object which comprises the functions and streams of the connected objects which constitute it and makes some of them available to the user of the group object. In this step, a structure is therefore created (SD_O3) for the basic features of the connected object. Additionally, the group object is associated with a proxy which allows the link to be made between the addresses of the group object and the addresses of the connected object. An example is given schematically in table 1 below for which:

the first row indicates the identifier and the name of the group object (ID_G, "person detector";
the second row includes the proxy PY_G, which includes at least one address of the connected object (@O3) and one address of the group object (@AV_G);
the following rows correspond to the structure of the object O3: Identifier of the object, basic streams and functions (features).

TABLE 1 example of group object avatar after creation
and insertion of the first object
"Person detector" group object ID_G
Proxy (PY_G): @O3 <=> @AV_G
Camera object data structure (SD_O3)

| Identifier | Basic functions | | Basic stream | |
|---|---|---|---|---|
| ID_O3 | C1_O3 | image capture | C4_O3 | face still image |
| | C2_O3 | zoom | C5_O3 | image stream |
| | C3_O3 | face recognition | C6_O3 | zoomed image stream |

According to one variant, the object already has an avatar. In this case, the insertion mechanism is very simple: the object is already represented in the form of an "avatar" comprising a data structure which comprises the features of the object, and a proxy which contains its address. It is just a matter of extracting, from the object avatar, the function and stream features of the object, along with its address (@O4), in order to copy them into the group avatar created previously.

In a step E11/E40, the user declares a second connected object to be aggregated in the group object. According to this example, it is the motion detector (04) in the local area network. The object is a physical object. According to one variant, the object is virtual and already has an avatar. The same comment as above applies.

In a step E22, the aggregation device receives the declaration of the object and accesses its features and/or its avatar.

In a step E23, the aggregation device (DAG/CRAVG) inserts the object into the group avatar. In this step, a structure is therefore created (SD_O4) and the basic features of the connected object O4 are copied thereto. Additionally, the new connected object is associated with the proxy which allows the link to be made between the addresses of the group object and the addresses of the connected object. An example is given in table 2 below:

TABLE 2 example of group object avatar after insertion of the second object
"Person detector" group object
Proxy (PY_G)
@O3, @O4 <=> @AV_G
Camera object data structure (SD_O3)

| Identifier | Basic functions | | Basic stream | |
|---|---|---|---|---|
| ID_O3 | C1_O3 | image capture | C4_O3 | face still image |
| | C2_O3 | zoom | C5_O3 | image stream |
| | C3_O3 | face recognition | C6_O3 | zoomed image stream |

Detector object data structure (SD_04)

| ID_O4 | C1_O4 | motion detector | C2_O4 | motion stream |
|---|---|---|---|---|
| | | | C3_O4 | motion detection command |
| | | | C4_O4 | motion type stream |

3. Creation of the Data Structure of the Group Object i. Resulting Features of the Group Object The group object created from several connected objects may benefit from the features of these objects (the output stream of the camera) and/or propose new ones (the person detector) via an operation of combining, cascading, enhancing, etc. the basic features of the objects. In a step E24, a structure SD_OG is created to host the features of the group object. According to the example, the group object has a detection command (C2_OG) as an input stream, an image of the detected person (C4_OG) as an output stream, and performs the "person detection" function (C1_OG).

ii. Links Between the Connected Objects of the Group Object

In step E24, the objects connected within a group are linked together by automatic processes, or links (L). Such a process may be in the form of a computer program which transmits information streams resulting from a combination of streams from or states of objects linked to one another in the group, or processes information streams from third-party objects, these streams being distributed among all of the objects which are linked to one another.

The linking of objects may be carried out "manually" by their owner, who thus has the ability to create new group objects by choosing the links between the objects. In the example above, if the user wishes to retrieve only the information about a user having entered the room and a still image of the user, the motion detector can be linked to the camera in the following way: if it detects motion, a first link (L1) is activated in order to trigger the camera. Then a second link (L2) is activated on the camera in order to trigger acquisition and processing of the captured image.

According to one variant, certain objects used in very common situations may be pre-edited with a set of associated rules, which the user may simply select; such a rule may be of the type: if motion is detected at the output of the sensor, send a trigger order to camera/SMS to mobile, etc.). They are then available in a catalog and can be configured by the owner. Other objects may be more complex. An example of links is shown in the table below, representative of the "person detection" object according to the example, on completion of step E24.

TABLE 3 example of group object avatar after creation of
links and of the group object structure
"Person detector" group object
Proxy (PY_G): @O3, @O4 <=> @AV_G
Camera object data structure (SD_O3)

| Identifier | Basic functions | | Basic stream | |
|---|---|---|---|---|
| ID_O3 | C1_O3 | video capture | C4_O3 | still image stream |
| | C2_O3 | camera zoom | C5_O3 | video stream |
| | C3_O3 | image capture | C6_O3 | video capture command |
| | | | C7_O3 | camera zoom command |
| | | | C8_O3 | image capture command |

Detector object data structure (SD_04)

| ID_O4 | C1_O4 | motion detector | C2_O4 | motion stream |
|---|---|---|---|---|
| | | | C3_O4 | motion detection command |
| | | | C4_O4 | motion type stream |

Group object data structure (SD_G)

| Identifier | group functions | | Group stream | |
|---|---|---|---|---|
| ID_G | C1_OG | person detector | C2_OG | detection command |
| | | | C3_OG | person detected OK |
| | | | C4_OG | detected person image |

O3-O4 link structure (SD_L)

| L1: Camera trigger program | L2: Face capture program |
|---|---|
| {if motion detection at output O3 then trigger camera O4} | {if camera triggered, photograph and transmit image at camera output O4} |

On completion of these steps, the group object therefore has an avatar comprising certain specific features, certain basic features of the connected objects, the others being inaccessible, links, a proxy in order to access it transparently via the address of the group avatar, and possibly a graphical representation.

Optionally, the user (on their smartphone) and the proxy may exchange a secret in order to be able to communicate in a secure manner.

4. Management of Group Object Rights

In a step E11-E25, rights may be implemented on the group object. This step consists in assigning a type of right to each of the features of the group object which has just been created, as well as, where applicable, to certain basic features of the connected objects. The target feature may be reserved for the owner or shared with others. This aspect will be discussed later with reference to FIG. 6.

5. Showing the Group Object (Making the Object Available)

In steps E26, E16, the aggregation device provides the owner of the connected objects with the address of the group object, that is to say the avatar address (@AV_G) contained in the avatar proxy. By virtue of this address, for example a URL, the user can access the group object. Optionally, the group avatar is also provided with a representation of the group object. This representation may be of any type (graphical, textual, sound, etc.). It is transmitted in this step, for example to the smartphone of the user, who can receive this representation and then "sees" the group object in the form of an HMI; for example, the representation associated with the group object may show/display:
   the functions of the object: detecting a person;
   user commands (for example by clicking on a button, the user can launch detection);
   the output stream of the camera (a still image);
   etc.

The owner PR of the connected objects, provided with the address of the group avatar (@AV_G) and possibly with the shared secret (S) and with a representation (HMI) of the object, can now connect to the group avatar, for example via the graphical interface which is displayed on their smartphone. When they want to share a group of objects of which they are the owner, they can provide the person with whom they wish to share the group with the address of the group object. In this exemplary embodiment, the user benefiting from the sharing has the same rights to the group object and to the connected objects as the owner. In one variant, which will be detailed with reference to FIG. 6, the rights to the objects are treated differently depending on the user.

6. Implementation of the Group Object

According to one exemplary implementation, the owner, or a user to whom they have transmitted the address of the group object, decides, in a step E17, to implement the group object. To this end, they prepare a message to send to the group object (over the address @AV_G which was communicated to it previously), requesting a specific feature offered by the group object, according to this example person detection (C1_OG).

The device for the implementation of the group object on the gateway (module EXAVG) receives this message in a step E27. It queries the group avatar database to obtain the group avatar (AV_G) of the object.

In step E28, it analyzes the command received, tests the validity of the feature C1 requested for the group, and possibly tests the rights of the person attempting to use the object. It then awaits motion which could trigger motion capture.

In step E29, it receives the motion information sent by the motion sensor in a step E41.

In step E30, it executes the corresponding link L1 (the program which activates the still image capture of the camera on detection of motion), triggers the camera and may receive in response the stream from the camera, symbolically represented by a solid arrow, and retransmit it in a step E31 to the terminal of the user. The user receives the image of the person who has entered the room.

Figure 6:
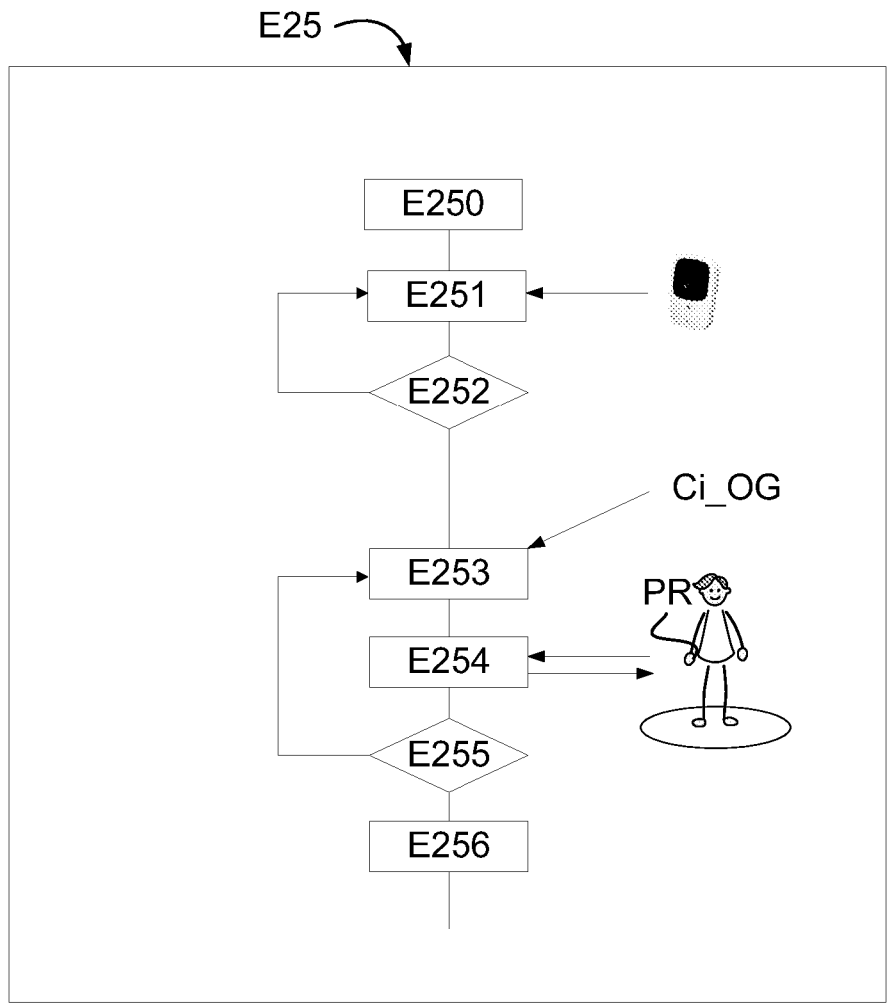
FIG. 6 shows one implementation of the use of rights to a group object.

FIG. 6 shows an exemplary implementation of the distribution of rights to the group object. This is a detail of step E25 of the previous figure when the rights management is implemented. Naturally, this step E25 could be distributed between the different steps of the algorithm (in particular steps E1, E21, E23, E24) of creation of the avatar, without loss of generality.

In the description above it was considered that all of the connected objects of the user were without specific rights, which does not present any problem as long as the owner of the connected objects and the user of the group object are one and the same person.

However, it may be important to assign rights to the different connected objects, and to the resulting group objects, according to the wishes of their owner, so that the latter may in particular share them with another user while retaining control of certain functions.

In the example described above, it may be imagined that the owner has all of the rights to the camera and to the motion sensor, but wishes to restrict the rights to these objects when they share them. They also wish to restrict the rights to the group object.

As illustrated with reference to table 4 below, according to an example:
   PR indicates the owner, UL any local user (for example another person in the household), UD any remote user (for example on the Internet network), PN a specific person designated by name (for example the son, the neighbor, etc. of the owner), PG a person designated by geolocation (for example, the inhabitants of the street);

each of these potential users may have rights to none, one or more features of the connected objects and/or of the group object; it is also possible distinguish:

the rights of use according to which a user has the right to use the object;

the composition rights to connected objects and/or to the group object; specifically, a user may have the right to use certain features of the camera without however having the right to reuse the camera in order to integrate it into another group object;

transmission rights according to which a user may transmit one of the two preceding rights to another user.

According to one embodiment, the rights are independent of one another. According to another embodiment, the rights are nested: the beneficiaries of the transmission rights are a subset of the beneficiaries of the composition rights who are themselves a subset of the beneficiaries of the rights of use.

It should be noted that the object itself may hold its rights: it may propose or not propose to be composed, used, etc. by a certain type of user.

It should also be noted that the rights may be defined by a system of requests addressed to the owners of the basic objects.

Analysis of this table shows that, according to this example:

the owner (PR) has all of rights to all of features of all of the objects, whether it is a right of use, or composition or transmission rights;

the owner (PR) may share (i.e. transmit the rights to) their objects individually (e.g. the camera) or as a group (e.g. the person detection group);

a local user (UL) has the rights to some features of the camera (image or video capture, associated commands and streams) but not to others (zoom, associated command and stream); they also have the rights to motion detection but cannot access the motion stream; they have the right to reuse these features in another object (right of composition); they have no rights to the group object;

any remote user (UD) only has the right to capture a still image (associated command and stream) unless they are located in a given geographical area (PG), in which case they may access video; they have no rights of use to motion detection, nor to the group object, nor any composition rights.

a user in a given geographical area (PG) has a right of use to access the video of the camera; they have no rights of use to motion detection, nor to the group object, nor any composition rights;

a designated user (PN) may access the person detector, but has no composition rights.

Of course, this example is provided by way of illustration. In particular, it has been assumed here that the camera and the detector belong to the same user but they could belong to two different users.

TABLE 4 example of a table of rights (DR) to the different objects and to the group

| Object | Charact. | Description | Rights of use | Composition rights | Transmission rights |
|---|---|---|---|---|---|
| O4 (camera) | C1_O3 | video capture | PR, UL, PN | PR, UL | PR |
| | C2_O3 | camera zoom | PR | PR | PR |
| | C3_O3 | image capture | PR, UL, UD, PN | PR, UL | PR |
| | C4_O3 | still image stream | PR, UL, UD, PN | PR, UL | PR |
| | C5_O3 | video stream | PR, UL, PG | PR, UL, PG | PR, PG |
| O3 (motion detector) | C1_O4 | motion detector | PR, UL | PR, UL | PR |
| | C2_O4 | motion stream | | | |
| | C3_O4 | detected motion type stream | PR, UL PR | PR, UL PR | PR PR |
| OG (person detector) | C1_OG | person detector | PR, PN | PR | PR |
| | C2_OG | detection | PR, PN | PR | PR |
| | C3_OG | command | PR, PN | PR | PR |
| | C4_OG | person detected detected person image | PR, PN | PR | PR |

According to one variant, the rights may be propagated according to one or more propagation mechanisms within the capability of those skilled in the art: in the example of the table above, a local user (UL) has a composition right to an object, but does not have the right to transmit this right, that is to say they may not register this right in the table of rights of the object being shared.

According to a similar example, an owner PR who gives a right to use their camera may refuse the right of transmission: thus, a user who creates a new object with the camera and their own detector will not have the right to share the camera with a third user (and therefore consequently they will not have the right to share the use of the object they have composed either).

In a system according to one embodiment, it is possible to make available a mechanism for requests to the owner and accepting on their part in order to obtain a sharing right; in this case the objects may be non-shareable by default.

According to yet another similar example, the group object inherits systematically, or by default, the rights of the objects of which it is composed, etc.

According to another embodiment (not shown), the connected objects inherit systematically or by default the rights of the group object encapsulating them.

Any other variant of rights management within the capability of a person skilled in the art may be envisaged.

A method according to one embodiment of the invention carries out the following steps:

In an initial step E250, the rights management module DGD initializes a table of rights (DR) structure; This table may be a separate structure, or a set of data attached for example to the different features of the other tables, as shown in FIG. 3 (structures DR_).

In a step E251, the module acquires the rights to the objects constituting the group, the step being reiterated until all of the objects in question of the group have been processed. These rights may be:

registered by default in the structure of the object. For example, all of the connected objects offer a right of use to certain features implemented in the group object, or to all of the features, or even to none of the features;

inherited;

defined by the user in this step or any step preceding step E25.

It is possible, for example, to end up with an assignment of rights as presented in table 4 for the objects O3 and O4;

in a step E252, a test is carried out with the aim of acquiring a next object if it exists.

Then, in a step E253, if there are no more connected objects to process, the module acquires a feature Ci_OG of the group object;

in a step E254, it assigns a right to the feature of the group object; different strategies may be implemented, some examples of which are given below:

the group object "inherits" the rights of the objects concerned with this feature, preferably according to a restriction: for example if the group is composed of a public object offering all of the rights and of a private object (private detector), it is possible to choose to assign the minimum rights of the private object in the group object (it is a minimum intersection in this case); according to another example, with feature C1 of the group object (person detection) calling on the camera, only the shareable functions of the camera are declared accessible at the level of the group object (the zoom remains strictly reserved for the owner, but the video stream is made shareable to the inhabitants of the street, etc.);

alternatively, it is possible to make available a mechanism for requests to the owner of the object and accepting on their part in order to obtain a particular right to an object for a given user or a group of users;

the initial owner of the object (PR) decides, globally or on a case-by-case basis (for each feature) on the associated rights by entering them for example via a human-machine interface.

the group object inherits only the right to the features which are implemented by the group (only the still image capture function of the camera being made accessible to the group, just any user will not be able to access the video stream);

etc.

In a step E255, a test is carried out with the aim of processing a following feature of the group object.

In a step E256, when all of the features of the group object have been processed, the table of rights is updated. It may be used in step E27/E28 of FIG. 5 to decide whether the user making the request has rights to a feature of the group object and/or rights to one or more features of a connected object of the group object.

It goes without saying that the embodiment which has been described above has been given purely by way of wholly non-limiting indication, and that numerous modifications may easily be made by those skilled in the art without, however, departing from the scope of the invention.

The invention claimed is:

1. An aggregation method for an at least partially automatic aggregation of at least two connected objects of a communications network, said at least two connected objects having at least one feature, called a basic feature, said method comprising the following acts on an aggregation device, in order to obtain a representation of a group object, called a group avatar, suitable for representing said at least two connected objects to be aggregated:

obtaining at least one basic feature of said at least two connected objects, at least one right being associated with said at least one basic feature;

obtaining at least one feature of the group object according to at least one aggregation criterion, said at least one feature of the group object being linked to at least one first basic feature of said at least one basic feature of said connected objects;

creating the group avatar, said group avatar comprising:
at least one first data structure for said connected objects, called a basic structure, comprising said at least one basic feature;
a second data structure, called a group structure, comprising said at least one feature of the group object;
a third data structure, called a link structure, for linking said at least one feature of the group object to said at least one first basic feature;
a data structure, called a rights structure, comprising said at least one right associated with the at least one basic feature; and
an address management structure, called a group proxy, comprising at least one correspondence between at least one address of the group avatar and at least one address of said connected objects.

2. The aggregation method as claimed in claim 1, wherein the method further comprises:

obtaining the at least one right associated with at least one of said at least one basic feature and/or at least one right associated with said at least one feature of said group;

registering said obtained right in said rights structure of the group avatar.

3. The aggregation method as claimed in claim 2, wherein the rights structure further comprises an identification of at least one beneficiary of the obtained at least one right and the method further comprises:

obtaining said at least one beneficiary of the obtained at least one right;

registering said at least one beneficiary in said rights structure of the group avatar.

4. The aggregation method as claimed in claim 2, wherein at least one first right of said obtained at least one right is a right of use allowing the at least one of said at least one basic feature and/or said at least one feature of said group associated with said at least one first right to be implemented.

5. The aggregation method as claimed in claim 2, wherein at least one first of said obtained at least one right is a composition right allowing use of an object of the group or the group object in a new group object.

6. The aggregation method as claimed in claim 2, wherein at least one first of said obtained at least one right is a transmission right allowing transmission of a right of use or composition right.

7. The aggregation method as claimed in claim 2, wherein obtaining the at least one right associated with at least one of said at least one basic feature and/or said at least one feature of said group comprises deducing the at least one right associated with said at least one feature of the group object according to at least one right associated with at least one of said at least one basic feature.

8. The aggregation method as claimed in claim 2, wherein the method further comprises deducing at least one of the at least one right associated with at least one of said at least one basic feature according to at least one right associated with said least one feature of the group.

9. An aggregation device for an aggregation of at least two connected objects of a communications network, said at least two connected objects having at least one feature, called a basic feature, said aggregation device comprising, in order to obtain a representation of the group, called a group avatar, suitable for representing said at least two connected objects to be aggregated:
- a processor; and
- a non-transitory computer-readable medium comprising instructions stored thereon which when executed by the processor configure the device to:
  - obtain at least one basic feature of said at least two connected objects, at least one right being associated with said at least one basic feature;
  - obtain at least one feature of the group object according to at least one aggregation criterion, said at least one feature of the group object being linked to at least one first basic feature of said at least one basic feature of said at least two connected objects;
  - create the group avatar, said group avatar comprising:
    - at least one first data structure for said at least two connected objects, called a basic structure, comprising said at least one basic feature;
    - a second data structure, called a group structure, comprising said at least one feature of the group object;
    - a third data structure, called a link structure, for linking said at least one feature of the group to said at least one first basic feature;
    - a data structure, called a rights structure, comprising said at least one right associated with the at least one basic feature;
    - an address management structure, called a group proxy, comprising at least one correspondence between at least one address of the group avatar and at least one address of said at least two connected objects.

10. The implementation device as claimed in claim 9, wherein the implementation device is comprised in a home gateway.

11. The aggregation device as claimed in claim 9, wherein the instructions further configure the device to:
- obtain the at least one right associated with at least one of said at least one basic feature and/or at least one right associated with said at least one feature of said group; and
- register said obtained right in said rights structure of the group avatar.

12. The aggregation device as claimed in claim 11, wherein the rights structure further comprises an identification of at least one beneficiary of the obtained at least one right and the instructions further configure the device to:
- obtain said at least one beneficiary of the obtained at least one right; and
- register said at least one beneficiary in said rights structure of the group avatar.

13. The aggregation device as claimed in claim 11, wherein at least one first right of said obtained at least one right is a right of use allowing the at least one of said at least one basic feature and/or said at least one feature of said group associated with said at least one first right to be implemented.

14. The aggregation device as claimed in claim 11, wherein at least one first of said obtained at least one right is a composition right allowing use of an object of the group or the group object in a new group object.

15. The aggregation device as claimed in claim 11, wherein at least one first of said obtained at least one right is a transmission right allowing transmission of a right of use or composition right.

16. The aggregation device as claimed in claim 11, wherein the instructions further configure the device to obtain the at least one right associated with at least one of said at least one basic feature and/or said at least one feature of said group by deducing the at least one right associated with said at least one feature of the group object according to at least one right associated with at least one of said at least one basic feature.

17. The aggregation device as claimed in claim 11, wherein the instructions further configure the device to deduce at least one of the at least one right associated with at least one of said at least one basic feature according to at least one right associated with said least one feature of the group.

18. The aggregation device as claimed in claim 9, wherein the aggregation device is comprised in a home gateway.

19. The implementation device as claimed in claim 18, wherein the implementation device is comprised in a home gateway.

* * * * *